April 23, 1940.　　　G. I. EVERETT ET AL　　　2,197,973
NOSE PROTECTOR
Filed July 9, 1938
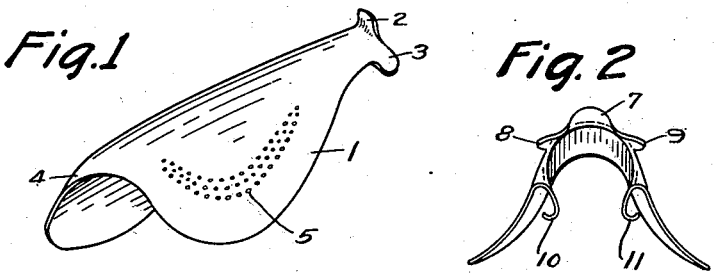
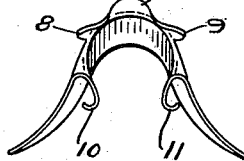
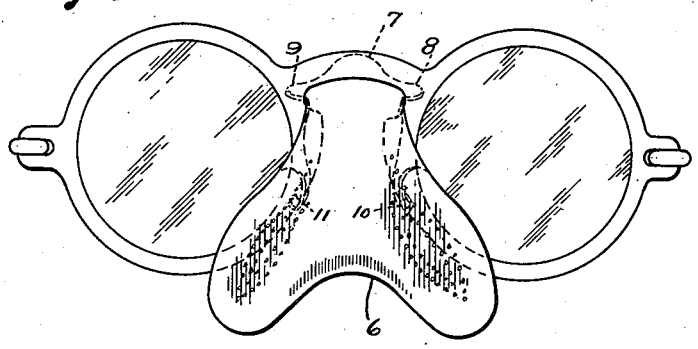
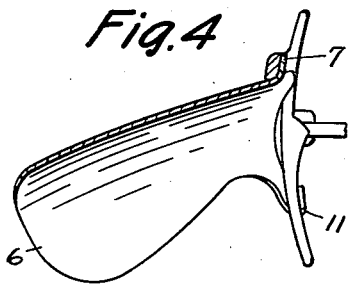
INVENTOR.
George I. Everett
BY & Deane W. Colton
James Harrison Bowen
ATTORNEY.

Patented Apr. 23, 1940

2,197,973

UNITED STATES PATENT OFFICE 2,197,973

NOSE PROTECTOR

George Ira Everett, Jackson Heights, Long Island, and Deane W. Colton, New York, N. Y.

Application July 9, 1938, Serial No. 218,318

2 Claims. (Cl. 2—13)

The purpose of this invention is to provide means for mounting a detachable shield on the frame of a pair of glasses so that the shield will extend outward above the nose without engaging the nose, and, at the same time, be completely supported from the frame of the glasses.

This and other purposes of the invention will appear from the following description taken in connection with the drawing, wherein:

Figure 1 is a view showing the shield in the preferred design.

Figure 2 is a view looking toward the upper end of the shield showing the spring clips for engaging the rims of the glasses, and also the lip at the top and the ears at the sides.

Figure 3 is a view showing a front elevation of the device shown in Figure 2 mounted upon a pair of glasses.

Figure 4 is a cross section through the device shown in Figure 3 with the shield and glasses shown in section.

The shield 1 may be made of Celluloid or any suitable material, and this may be shaped to fit over the nose, with the inner end detachably supported from the frame of a pair of glasses, with any means by which it will be permanently suspended outward slightly above the nose. The inner end may be provided with a flange or lip 2 and ears 3 at the sides by which it may be held to the glasses, and the outer end may be curved slightly downward as shown at the point 4, and the sides may be perforated as shown at the point 5 to provide circulation through the shield, if desired. The ears 3 may be snapped into the usual recesses at the intersections of the rims of the glasses with the ends of the bridge, and the lip 2 may fit snugly against the back of the bridge, thereby positively mounting the shield upon the glasses, with the major part thereof suspended slightly above the nose.

The shield may also be made as shown in Figures 2 and 3, in which the shield is indicated by the numeral 6 and the inner end is provided with an upwardly curved flange 7, with ears 8 and 9 similar to the parts 2 and 3; however, this shield is provided with supporting clips 10 and 11, that extend downward from the edges of the shield, and may be snapped over the rims of the glasses. These clips provide additional supporting means holding the shield at another point or points, making it possible to insure suspending the shield above the nose, and, at the same time, making it possible to simulate the integral shield of our prior patent.

The construction will be readily understood from the foregoing description. In use the shield may be provided as a separate and independent unit, and this may be squeezed together and placed through the center of the glasses, with the ears, lip and sides snapping into the glasses as shown in the drawing, and, with the device in place, it will be permanently or rigidly mounted and suspended in such a position that it will be slightly above the nose.

The device is, therefore, positively held to the frame of the glasses, and, with this particular configuration, it may be snapped into or mounted upon glasses of substantially any design.

Having thus fully described the invention, what we claim as new, and desire to secure by Letters Patent, is:

1. A nose protector for use with a pair of glasses having a nose bridge comprising a shield shaped to conform substantially to the contour of the nose, having a relatively narrow upper end the width of which corresponds with the width of the opening under the bridge, and relatively small projections at both sides of the upper end adapted to be forced together when inserting the shield in the opening below the bridge and, when in place, released to provide holding means at the sides of said shield, and further characterized by an upwardly curved lip at the end of said shield positioned to engage the rear surface of the bridge, said lip cooperating with said projections to mount said shield in an outwardly extending position above the nose of one wearing the glasses with the shield mounted thereon.

2. A nose protector and shield, as described in claim 1, having supporting members extending from the sides thereof engaging rims of the glasses for cooperation with the said projections for suspending said shield in an outwardly inclined position.

GEORGE IRA EVERETT.
DEANE W. COLTON.